(12) United States Patent
Cario et al.

(10) Patent No.: US 12,476,250 B2
(45) Date of Patent: Nov. 18, 2025

(54) ELECTROCHEMICAL CELLS BASED ON INTERCALATION AND DEINTERCALATION OF CHALCOGEN ANIONS

(71) Applicants: Centre national de la recherche scientifique, Paris (FR); Nantes Université, Nantes (FR)

(72) Inventors: Laurent Cario, Nantes (FR); Shunsuke Sasaki, North Oxford (GB); Stéphane Jobic, Bouguenais (FR); Maria Teresa Caldes, Nantes (FR); Etienne Janod, La Chapelle sur Erdre (FR); Benoît Corraze, Nantes (FR); Isabelle Braems-Abbaspour, Nantes (FR); Louis-Béni Mvele, Nantes (FR); Catherine Deudon, Nantes (FR)

(73) Assignee: Centre national de la recherche scientifique, Paris (FR)

( * ) Notice: Subject to any disclaimer, the term of this patent is extended or adjusted under 35 U.S.C. 154(b) by 0 days.

(21) Appl. No.: 18/259,259

(22) PCT Filed: Dec. 24, 2021

(86) PCT No.: PCT/EP2021/087650
§ 371 (c)(1),
(2) Date: Jun. 23, 2023

(87) PCT Pub. No.: WO2022/136707
PCT Pub. Date: Jun. 30, 2022

(65) Prior Publication Data
US 2024/0055601 A1    Feb. 15, 2024

(30) Foreign Application Priority Data
Dec. 24, 2020 (FR) ..................... 2014131

(51) Int. Cl.
*H01M 4/58* (2010.01)
*H01M 4/02* (2006.01)
(Continued)

(52) U.S. Cl.
CPC ....... *H01M 4/5815* (2013.01); *H01M 4/0404* (2013.01); *H01M 4/661* (2013.01);
(Continued)

(58) Field of Classification Search
CPC .. H01M 4/5815; H01M 4/0404; H01M 4/661; H01M 10/0565; H01M 2004/021;
(Continued)

(56) References Cited

U.S. PATENT DOCUMENTS

| | | | | |
|---|---|---|---|---|
| 5,279,801 A * | 1/1994 | Colombet | ............. | C01F 17/294 423/563 |
| 2005/0196672 A1* | 9/2005 | Mukherjee | ............ | H01M 4/131 429/317 |

OTHER PUBLICATIONS

Sasaki et al., Unexplored reactivity of (Sn)2-oligomers with transition metals in low-temperature solid-state reactions. 2019, Chem Commun, 55, 6189 (Year: 2019).*

(Continued)

*Primary Examiner* — Daniel S Gatewood
(74) *Attorney, Agent, or Firm* — Soquel Group LLC

(57) ABSTRACT

An electroactive material suitable for electrochemical cell electrode wherein the electroactive material includes a chalcogen oligomer that can reversibly deintercalate/reintercalate an anion of the chalcogen, such as $La_2O_2S_2$, and the electrochemical electrodes and cells containing the electroactive material.

12 Claims, 5 Drawing Sheets

(51) Int. Cl.
  *H01M 4/04* (2006.01)
  *H01M 4/66* (2006.01)
  *H01M 10/0565* (2010.01)
(52) U.S. Cl.
  CPC .. *H01M 10/0565* (2013.01); *H01M 2004/021* (2013.01); *H01M 2004/028* (2013.01); *H01M 2300/0082* (2013.01)
(58) Field of Classification Search
  CPC ... H01M 2004/028; H01M 2300/0082; H01M 2300/0065; H01M 10/054; H01M 4/581; H01M 4/136; Y02E 60/10
  See application file for complete search history.

(56) References Cited

OTHER PUBLICATIONS

International Search Report, PCT /EP2021/087650, May 2, 2022, 2 pages.

Sasaki Shunsuke et al: A Topochemical Approach to Synthesize Layered Materials Based on the Redox Reactivity of Anionic Cha lcogen Dimers 11, Angewandte Chemie International Edition, vol. 57, No. 41, 21 aout 2018 (Aug. 21, 2018), pp. 13618-13623.

Sasaki Shunsuke et al: "Unexplored reactivity of (Sn)2-oligomers with transition metals in low-temperature solid-state reactions", Chemical Communications, vol. 55, No. 44, May 2, 2019 (May 2, 2019), pp. 6189-6192.

Arumugam Manthiram, et al., Chemical Reviews. ACS Publications, "Rechargeable Lithium-Sulfur Batteries", 2014, pp. 11751-11787.

FR 2014131, INPI Rapport de Recherche Preliminaire, Sep. 8, 2021, 2 pages.

Yurlov, I. S., et al., "Determination of Diffusion Coefficients for Sulfide Ions in Solid Electrolytes on the Basis of BaSm2S4 and CaGd2S4", ISSN 1023-1935, Russian Journal of Electrochemistry, 2007, vol. 43, No. 6, pp. 638-643.

* cited by examiner

ELECTROCHEMICAL CELLS BASED ON INTERCALATION AND DEINTERCALATION OF CHALCOGEN ANIONS

CROSS-REFERENCE TO RELATED APPLICATIONS

This application claims benefit under 35 USC § 371 of PCT Application No. PCT/EP2021/087650 entitled ELECTROCHEMICAL CELLS BASED ON INTERCALATION AND DEINTERCALATION FO CHALCOGEN ANIONS, filed on Dec. 24, 2021 by inventors Laurent Cario, Shunsuke Sasaki, Stéphane Jobic, Maria Teresa Caldes, Etienne Janod, Benoit Corraze, Isabelle Braems-Abbaspour, Louis Béni Mvele and Catherine Deudon. PCT Application No. PCT/EP2021/087650 claims priority of French Patent Application No. 20 14131, filed on Dec. 24, 2020.

FIELD OF THE INVENTION

The present invention concerns the field of electrochemistry, and solid ion batteries in particular.

BACKGROUND OF THE INVENTION

In view of the global warning and the shortage of natural ressources, the production and storage of renewable energy are crucial and represent one of the major challenges for the scientific community.

Electric devices and electric transportation are nowadays based on lithium batteries. However, the lithium resources are limited. Therefore, researchers already consider alternative batteries with sodium for example.

In these batteries, the alcaline metal cation (Li+, Na+) ensures the conduction within the electrolyte: the cation (eg. $Li^+$ ion) is exchanged between two active materials located on the positive and the negative electrodes. These materials can intercalate and deintercalate lithium, at least in the positive electrode.

More recently, Li-ion batteries using elementar sulfur as a cathode have been considered (Manthiram et al. chem. Rev. 2014, 114, 11751-11787). However, in such lithium-sulfur batteries, the conducting ionic species which moves between the sulfur cathode and the lithium anode is still the lithium cation ($Li^+$).

Alternative ionic species were also studied as conducting species in the electrochemical cells, for example, zinc-ion batteries which include zinc at the negative electrode and manganese oxide at the positive electrode. These electrochemical systems are extensively studied but their interest is still questioned: after years of researches, the first stable charge/discharge cycle has been recently achieved for a battery using aluminium ions as the intercalated species. Magnesium ions batteries have been successfully achieved. Still, the use of alternative cations remains a challenge.

Batteries based on the intercalation or deintercalation of an anion have been substantially less investigated. Most of the researches focus on metal ions where $O^{2-}$ ions migrate from a air cathode towards a metal anode during the discharge. Organic anions have also been considered ($PF_6^-$, $BF_4^-$, TFSI). Alternative anion batteries use fluoride, chloride and metal halogenide such as $BiF_3$ and $BiC_3$ as a cathode and reactive metals such as lithium as an anode, so that the halogenide anions migrate from the cathode to the anode.

However, sources in lithium are limited and alternative materials need to be considered.

SUMMARY OF THE DESCRIPTION

Therefore, it is an object of the invention to provide alternative electroactive materials that rely on naturally abundant elements, such as chalcogens.

The present inventors have discovered that it is possible to deintercalate and re-intercalate at moderate temperature (<300° C.) chalcogen/chalcogenide, such as sulfur, from materials containing chalcogen oligomers, such as sulfur pairs.

This phenomenon has been proved to be reversible. This discovery allows to consider the use of such chacolgen materials to provide chalcogen-chalcogen, e.g. sulfur-sulfur, batteries. Such batteries involve active materials comprising chalcogen oligomers, such as chalcogen pairs, and the exchange of a chalcogen anion between the cathode and the anode.

Therefore, according to a first object, the present invention concerns an electroactive material for electrochemical cell electrode wherein said material comprises a chalcogen oligomer, characterized in that said material can reversibly deintercalate an anion of said chacolgen by reduction and reintercalate said anion by oxidation, while maintaining its overall structure.

The term «electroactive material» as used herein refers to materials that can be used as an electrode material and that can undergo an oxydo-reduction reaction.

Chalcogens are the chemical elements in group 16 of the periodic table. This group comprises in particular the following elements: oxygen (O), sulfur (S), selenium (Se), tellurium (Te). Typically, the chalcogen is sulfur.

The term "oligomer" denotes a neutral or charged chemical species comprising chalcogen atoms chemically linked to each other via strong chemical bonds. Typically, these blocks consist of a few identical chalcogen atoms, typically between 2 and 6, with a charge that can range from 1 to 2. Chalcogen oligomer thus represents a linear or non linear sequence of 2 to 6 chalcogen atoms, typically of formula $Q_n$, where Q represents a chalcogen atom and n represents an integer comprised between 2 and 6. Typically, the chalcogen oligomer is a sulfur pair (S—S).

Typically, said material comprising a chalcogen oligomer may be chosen in particular from $La_2O_2S_2$, $SrS_2$, $SrS_3$, $BaS_2$, $BaS_3$, $Ba_2S_2F_2$, $FeS_2$, $NiS_2$, $CoS_2$, $MnS_2$, $TiS_3$, $VS_4$, $PbS_2$, $BiS_2$ but any compound with a sequence of at least 2 chalcogen atoms can be of interest According to the invention, said materials comprise chalcogen oligomers that can be reduced to form chalcogen anions or chalcogen oligomers anions, such as:

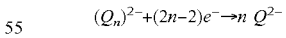

In the case where chalcogen is sulfur, the following reductive cleavage can take place: $(S_2)^{2-}+2e^- \rightarrow +2\ S^{2-}$ or $(S_3)^{2-}+4e^- \rightarrow 3\ S^{2-}$ As an illustration, $La_2O_2S_2$ structure consists of fluorite-type $2/\infty[La_2O_2]^{2+}$ infinite layers separated from each other by isolated $(S_2)^{2-}$ sulfur dimers aligned in parallel to these 2D blocks. The de-insertion (ie) deintercalation of one sulfur atom per dimer leads to a $La_2O_2S$ compound whose structure is inherited from the layered structure of the precursor $La_2O_2S_2$. This very new phase crystallizes in the Amm2 space group and is a new polymorph of the well known hexagonal La2O2S (hp-La2O2S (P-3m1)). Hereafter, the oA-La2O2S term will be used for this specific orthorhombic form in contrast with the well-known hexagonal form.

Accordingly, $La_2O_2S_2$ reversibly deintercalates and reintercalates $S^{2-}$ according to the following reaction:

$$La_2O_2S_2 + 2e^- \leftrightarrows oA\text{-}La_2O_2S + S^{2-}$$

where oA designates the centered orthorhombic crystalline form.

oA-La$_2$O$_2$S has never been synthesized or identified before. According to another object, the present invention thus also concerns the material of formula:

$$oA\text{-}La_2O_2S \qquad (I)$$

where oA designates the centered orthorhombic crystalline form.

Similarly, $La_2O_2S_2$ also reversibly deintercalates and reintercalates 0.5 $S^-$ according to the following reaction:

$$La_2O_2S_2 + e^- \leftrightarrows oA\text{-}La_2O_2S_{1.5} + 0.5S^{2-}$$

oA-La$_2$O$_2$S$_{1.5}$ (Amm2 space group) has never been synthesized or identified before.
According to another object, the present invention thus also concerns the material of formula (II):

$$oA\text{-}La_2O_2S_{1.5} \qquad (II)$$

where oA designates the centered orthorhombic crystalline form.

According to an embodiment, oA-La2O2S (I) can be prepared by a process comprising the steps of mixing $La_2O_2S_2$ and Rb and heating said mixture. Typically, the reaction can be conducted in sealed silica tube, preferably in 1:2 molar ratio. Typically the heating temperature is comprised between 20° and 350° C., in particular by application or adaptation of the procedure discussed in the examples.

According to an embodiment, oA-$La_4O_4S_3$ (II) can be prepared in a similar way. According to an alternative embodiment, it can also be prepared by intercalation of sulfur anions into oA-$La_2O_2S$ (ie) by a process comprising the steps of mixing oA-$La_2O_2S$ with S flakes, and heating said mixture. Typically, the mixture can be pelletized and sealed in an evacuated silica tube before the heating step. Typically, the heating temperature is comprised between 15° and 200° C.

Materials of formula (I) and (II) can be characterized by their X-ray and electron diffraction spectrum, as illustrated in the attached Figures.

As used herein, deintercalation refers to the de-insertion of an atom or ion from a host lattice where it has been residing, whereas reintercalation refers to the reinclusion (or reinsertion) into the lattice, in a reversible fashion and without modification of the overall crystal structure of the host material (ie) its lamellar structure.

According to the invention, a chalcogen (or chalcogenide) anion (typically $S^{2-}$) deintercalates from the electrode material during discharge (reduction) and reintercalates within said material during charge (oxidation), at the positive electrode.

According to an embodiment, said chalcogen anion is sulfur or an oligomer thereof of formula (III):

$$(S_n)^{x-} \qquad (III)$$

where n and x are integers, such that x equals to 1 or 2, and n is comprised between 1 and 6.
Typically, n is 1 and x is 2, so that said chalcogen anion is $S^{2-}$.

According to an embodiment, the electrochemical cell electrode is a positive electrode. The positive electrode refers to the electrode of an electrochemical cell herein referred to as element, where electrons enter, and where chalcogen ions leave in discharge.

The "positive electrode" designates in discharge, the electrode functioning as a cathode and in charge, the electrode functioning as an anode, the anode being defined as the electrode where an electrochemical oxidation reaction (emission of electrons), while the cathode is the seat of reduction.

According to another object, the present invention also concerns a positive electrode comprising the electroactive material of the invention.

According to an embodiment, the positive electrode may comprise a current collector and a coating layer, wherein said coating layer comprises said electroactive material.

The positive electrode generally consists of a conductive medium used as a current collector which is coated with a mixture comprising the electroactive material, and, typically solid-state electrolyte particles, an electrically conductive additive and a binder.

The term "current collector" is understood to mean an element such as a pad, plate, foil, sheet, mesh, tissue or other, made of a conductive material, connected to the positive or negative electrode, and ensuring the conduction of the flow of electrons between the electrode and the terminals of the battery Typically, the current collector consists in a metal or alloy chosen from the group consisting in aluminium, copper, nickel, carbon, stainless steel, and the alloys thereof.

According to an embodiment, the current collector is an aluminium sheet.

According to another object, the present invention also concerns an electrochemical cell comprising:
  A positive electrode as defined above;
  A negative electrode;
  An electrolyte layer sandwiched between the positive and the negative electrodes, characterized in that the electrolyte is a solid electrolyte comprising as conducting ion the chalcogen anion of the chalcogen oligomer of the electroactive material.

The term "negative electrode" designates in discharge, the electrode functioning as an anode and in charge, the electrode functioning as cathode, the anode being defined as the electrode where an electrochemical oxidation reaction (emission of electrons) occurs, while the cathode is the seat of reduction.

Typically, the term negative electrode refers to the electrode from which electrons leave, and on which chalcogen anions are collected in discharge By "electrochemical cell" is meant an elementary electrochemical cell made up of the positive electrode/electrolyte/negative electrode assembly, allowing the electrical energy supplied by a chemical reaction to be stored and returned in the form of current.

According to an embodiment, the electrochemical cell is a solid-state cell.

In all-solid-type elements, the electrolytic compounds can be included in the solid-state electrolyte layer, but can also be partially included within the electrodes.

According to another object, the present invention concerns a battery comprising a plurality of electrochemical cells as defined above, wherein the cells are electrically connected.

By "battery" or accumulator is meant the assembly of several cells according to the invention.

DETAILED DESCRIPTION OF EMBODIMENTS

Figure 1:
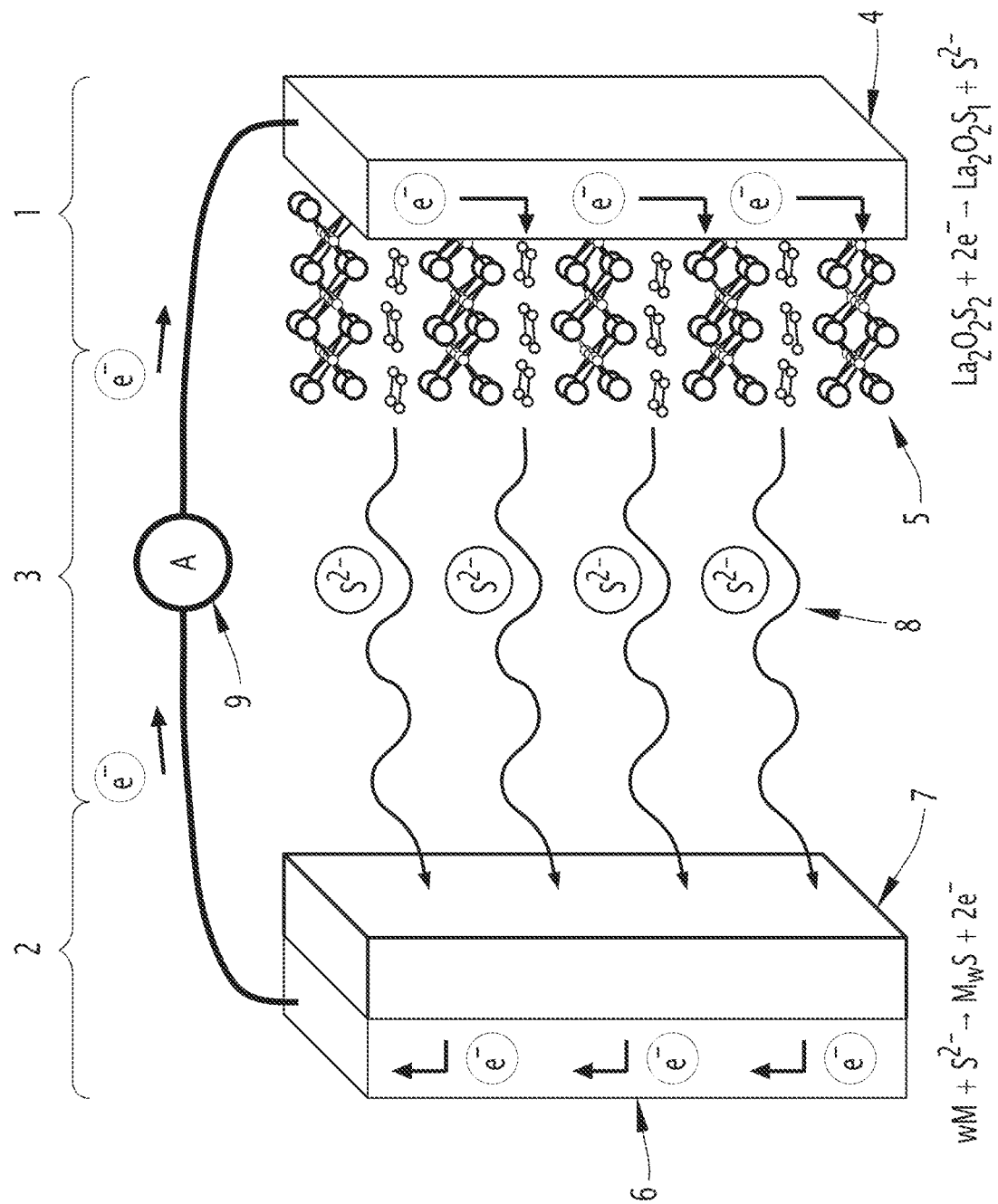
FIG. 1 illustrates the principle of a sulfur-sulfur battery according to the invention, involving sulfur as the chacolgen and $La_2O_2S_2$ as the electroactive material.

In FIG. 1, the cell of such a sulfur-sulfur battery is schematically represented during discharge.

Said cell comprises a positive electrode 1 (cathode), and a negative electrode 2 (anode). A sulfur anion conducting electrolyte 3 is sandwiched between electrodes l and 2.

Both electrodes 1 and 2 are electrically connected by means of an electrical circuit including an ammeter 9.

As depicted in FIG. 1:

The positive electrode 1 comprises a current collector 4 and a layer of electroactive material 5. The layer 5 is at the interface between the conducting electrolyte 3 and the inner face of the current collector 4. Typically, the current collector 4 may be an aluminum sheet.

The negative electrode 2 comprises a current collector 6 and a layer 7 at the interface between the conducting electrolyte 3 and the inner face of the current collector 6.

Generally, the current collector 6 of the negative electrode is made of copper.

The layer 7 can consist of a sulfur composite or metal M which can react with sulfur anion according to the reaction: $wM+S^{2-} \rightarrow M_wS+2e^-$. It can also consist of another material capable of intercalating and deintercalating sulfur anions.

During a discharge, the positive electrode 1 attracts electrons from the electrical circuit so that a reductive cleavage occurs, such as in the case of $La_2O_2S_2$:

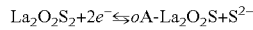

$La_2O_2S_2+2e^- \leftrightarrows oA-La_2O_2S+S^{2-}$

The $S^{2-}$ anion migrate through the electrolyte 8 from the positive electrode 1 towards the negative electrode 2 and are collected at the negative electrode 2 to undergo an oxidation, releasing electrons: $S^{2-} \rightarrow S^0+2\ e^-$ or $wM+S^{2-} \rightarrow M_wS+2e^-$ The resulting electrons are then migrating back to the positive electrode 1 through the electrical circuit 9.

Although not represented in FIG. 1, the opposite reactions occur in charge, where the positive electrode becomes the anode (set of the oxidation) and the negative electrode becomes the cathode (seat of the reduction).

The following examples are given for illustrative purposes only.

Figure 2:
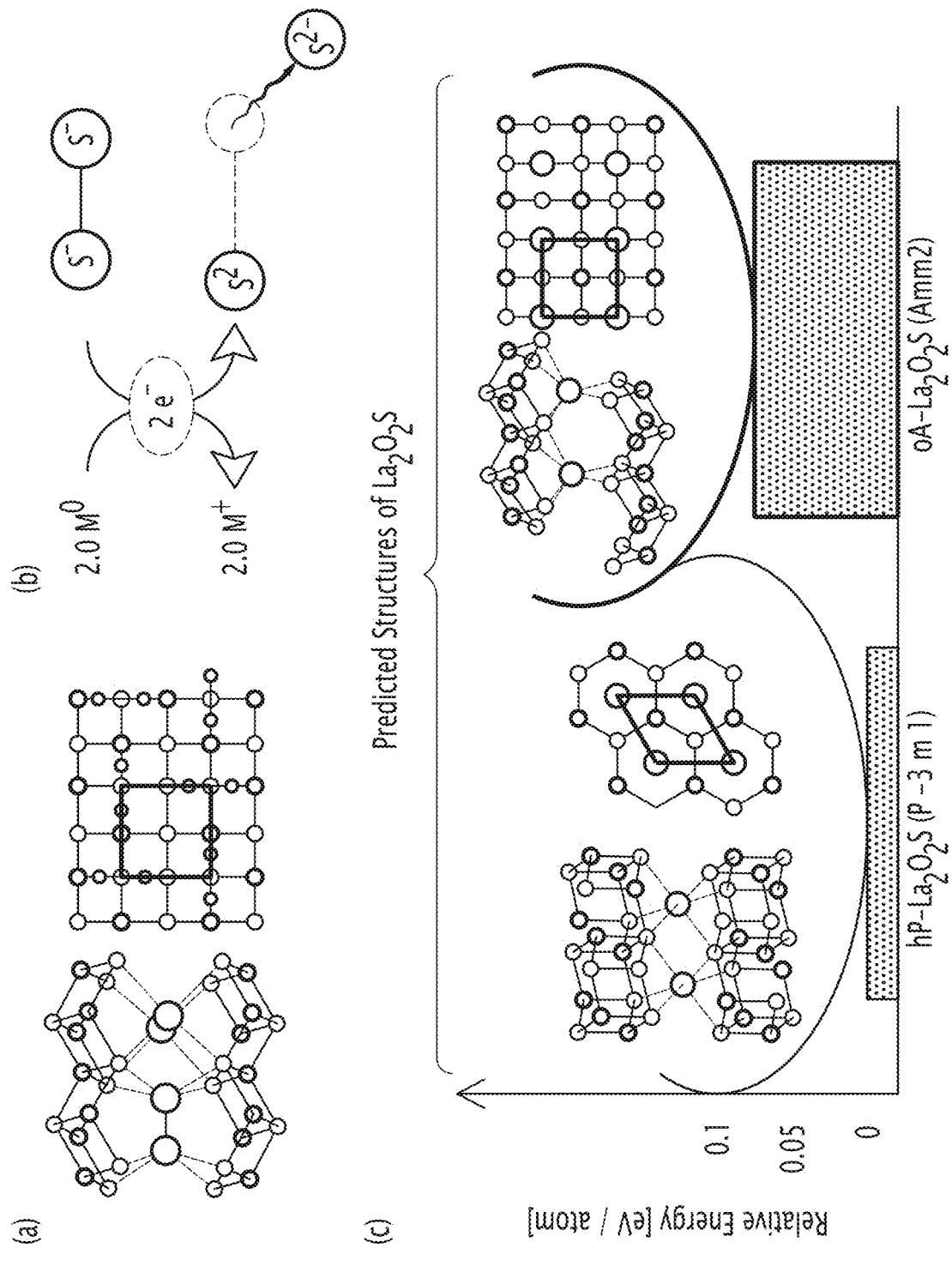
FIG. 2 illustrates (a) Structure of $La_2O_2S_2$ reported by Ostorero et al. (SG: Cmca) (*Acta Cryst. C*46, 1376-1378 (1990)); (b) Conceptual scheme of S—S bond cleavage under the donation of one electron per elemental metal $M^0$ that triggers subsequently the deintercalation of half sulfur atom of the $S_2$ dumbbell that possibly enables topochemical conversion of $La_2O_2S_2$ into the new polymorph of $La_2O_2S$; (c) The two low-energy dynamically stable phases of $oA-La_2O_2S$ predicted by USPEX.

EXAMPLES $La_2O_2S_2$ was used as the precursor to test the topochemical reduction for chalcogenides (FIG. 2a). Its structure consists of fluorite-type $2/\infty[La_2O_2]^{2+}$ infinite layers separated from each other by isolated $(S_2)^{2-}$ sulfur dimers aligned in parallel to these 2D blocks. The de-insertion of one sulfur atom per dimer should lead a priori to a $La_2O_2S$ compound (FIG. 2b) whose structure should be inherited from the layered structure of the precursor $La_2O_2S_2$. First, the low-energy structures of $La_2O_2S$ compound using a designed crystal structure prediction (CSP) methodology was investigated. The combination of USPEX structure searching evolutionary algorithm with first-principles calculations makes it possible to locate two polymorphs, namely hP and oA crystal structures that are respectively stable and metastable (see FIG. 2c). Both phases are dynamically stable, justifying their respective location at global and local minima on the potential energy surface of $La_2O_2S$. The most stable candidate exhibits a hexagonal layered structure with $2/\infty[La_2O_2]$fluorite-type (111) slab alternating with sulfur atoms in octahedral environment of lanthanum. Interestingly, this is the exact structure of the $La_2O_2S$ compound reported in the literature (*Acta Cryst. B*29, 2647-2648 (1973)), commonly prepared at high temperature (800-1200° C.). In the following this structure will be noted $hP-La_2O_2S$ according to the Pearson notation (h for hexagonal and P for primitive cell). USPEX predicted also the structure of a unknown metastable polymorph with an enthalpy only slightly higher. This structure displays also a layered feature but is built upon the stacking of $2/\infty[La_2O_2]$ fluorine-type (001) slabs (full reminiscence of the $La_2O_2S_2$ structure) alternating with sulfur atoms in prismatic environments. In the same way with $hP-La_2O_2S$, this metastable polymorph with orthorhombic Amm2 space group is named hereafter $oA-La_2O_2S$. The thermal and kinetic stability of these two structures were further confirmed by ab initio molecular dynamics (AIMD) simulation in which both hP- and $oA-La_2O_2S$ retained their main structural framework after 10 ps at temperatures up to 600 K. Consequently, the theoretical calculations clearly anticipate the possible existence of metastable $oA-La_2O_2S$ besides the already known phase $hP-La_2O_2S$.

Figure 5:
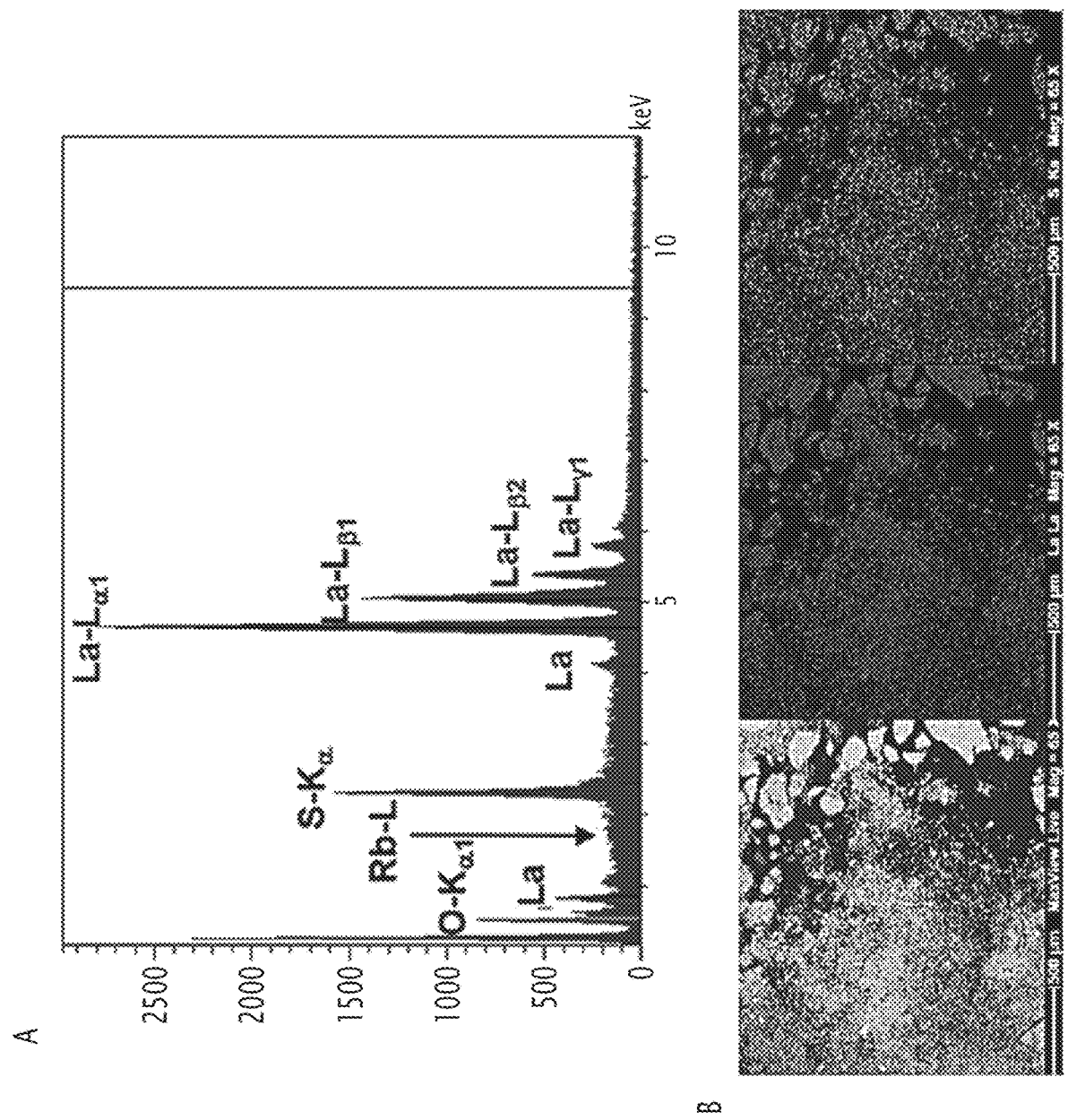
FIG. 5 represents (a) EDX spectrum of the $oA-La_2O_2S$ powder sample impregnated with the epoxy resin and (b) its backscattered electron image (BEI) as well as its elemental composition mapped for La and S.

The topochemical deinsertion of sulfur in the layered precursor $La_2O_2S_2$ was subsequently attempted by reaction with alkali metal $Rb^0$ at low-temperature in evacuated and sealed pyrex tubes. Once Rb excess (and its salts) was washed out by dry ethanol (see synthetic procedure in SI), the powder X-ray diffraction (XRD) patterns were collected on products synthesised at 200° C. and 350° C. Both of them turn out to be very similar and did not bring to light any known phases. Moreover, the EDX analyses of the bulk product powder clearly revealed the absence of rubidium and a molar ratio La/S of 2.0(2)/1.0(1) (See FIG. 5). These results indicate the formation of a sulfur-deficient $La_2O_2S$ phase without incorporation of Rb in the structure. The $hP-La_2O_2S$ XRD peaks were not detected at all in the X-ray pattern but the existence of the polymorph $oA-La_2O_2S$ predicted by USPEX could be readily established via a Rietveld refinement with goodness of fit $\chi^2=1.33$ and Bragg reliability factor R(obs)=1.67%: see Table below:

TABLE 1

Crystallographic parameters determined from Rietveld refinement of oA-$La_2O_2S$ powder.

Crystallographic data

| | |
|---|---|
| Chemical formula | $La_2O_2S$ |
| Molar mass (g mol$^{-1}$) | 341.87 |
| Symmetry | Orthorhombic |
| Color | White |
| Space group | Amm2 (No. 38) |
| a (Å) | 4.1489(1) |
| b (Å) | 3.9750(9) |
| c (Å) | 12.728(0) |
| Volume (Å$^3$) | 209.9(1) |
| Z | 2 |
| Density (g cm$^{-3}$) | 5.4088 |
| Anisotropic strain (Å$^{-2}$)$^2$ | $S_{400}$ = 11.8(9); $S_{040}$ = 8.66(0); $S_{004}$ = 0.0485(9); $S_{220}$ = 2.82(0); $S_{202}$ = 0.830(7); $S_{022}$ = 0.636(8); |
| March-Dollase parameter (Preferred orientation along <100>) | $P_{md}$ = 0.943(5) |

Structural refinement

| | |
|---|---|
| Profile reliability factor | $R_p$ = 6.38% |
| Weighted profile reliability factor | $R_{wp}$ = 8.73% |
| Bragg reliability factors | R(obs) = R(all) = 1.67% |
| Weighted Bragg profile reliability factors | $R_w$(obs) = $R_w$(all) = 2.29% |
| Goodness of fit | $x^2$ = 1.33 |

Atomic positions and isotropic thermal parameters$^a$

| Atom | x | y | z | $U_{iso}$ (Å$^2$) |
|---|---|---|---|---|
| La1 | 0 | 0 | 0.6442(4) | 0.0054(8) |
| La2 | 0.5 | 0.5 | 0.8379(7) | 0.0040(1) |
| O1 | 0 | 0.5 | 0.7350(1) | 0.001$^b$ |
| O2 | 0.5 | 0 | 0.7169(3) | 0.001$^b$ |
| S1 | 0 | 0 | 0.9664(7) | 0.0068(4) |

$^a$Site-occupancy factors of all atoms are fixed to full occupancy.
$^b$These atomic displacement factors are fixed to 0.001.

Scanning Transmission Electron Microscopy (STEM) also support the conclusion that the newly synthesized phase is oA-$La_2O_2S$. The stacking of 2/∞[$La_2O_2$] infinite sheets with the fluorine-type (100) slab structure is clearly visible on the High Angle Annular Dark Field (HAADF) STEM image. In contrast, the fluorite-type (111) slabs characteristic of the stable polymorph hP-$La_2O_2S$ could not be found in the experiment STEM image. The EDX spectrum of a nanosized single crystal was, similarly to the EDX analysis of the bulk powder, consistent with the composition of $La_2O_2S$. The structural arrangement of the new oA-$La_2O_2S$ compound is directly inherited from the one of the $La_2O_2S_2$. This observation definitely supports the topochemical nature of the deintercalation process. The sulfur deintercalation process does not modify at all the integrity of the 2/∞ [$La_2O_2$] slab but entails a shift of one 2/∞[$La_2O_2$] layer over two along the ½ (b+c) direction of the pristine $La_2O_2S_2$ structure (SG: Cmca). Raman spectroscopy confirmed the complete loss of the sulfur dimers along the topochemical reduction: the band associated to the S—S stretching modes located at 487 and 498 cm$^{-1}$ in $La_2O_2S_2$ have totally disappeared after the deintercalation of one sulfur from $La_2O_2S_2$ confirming the conclusion made from the XRD pattern that the reaction of hP-$La_2O_2S$ towards oA-$La_2O_2S$ was complete. Finally, the diffuse-reflectance spectra also support the cleavage of $(S_2)^{2-}$ dimers. The absorption thresholds move from 2.50 eV in $La_2O_2S_2$, a value characteristic of a $\pi^*$-$\sigma^*$ electronic transition of isolated pairs, to 3.88 eV in oA-$La_2O_2S$, a value slightly lower than the one observed in the hP-$La_2O_2S$ (4.13 eV). Thus, it was concluded that during the reaction with $La_2O_2S_2$ with elemental rubidium, the alkali metal activates a redox reaction with $(S_2)^{2-}$ dimers that trigger the fracture of the S—S bonds. However, contrary to $Cu^0$ nanoparticles that intercalate into the $La_2O_2S_2$ host lattice (*Angew. Chem. Int. Ed.* 57, 13618-13623 (2018)) $Rb^0$ leads to the topochemical de-insertion of sulfur to afford the oA-$La_2O_2S$ metastable phase. The choice of reducing agents is the decisive factor on the consequence of the reaction. No reaction occurred when $La_2O_2S_2$ was treated at 200-300° C. under reducing atmosphere, i.e. 5% $H_2$/Ar flow. At 350° C. the reduction finally happened, but it ended up with the thermodynamically stable hP-$La_2O_2S$, where the original fluorite (100) slab was deformed into the fluorite (111) slab. This result highlights the contrast between the common reducing agent such as $H_2$ and the more powerful reducing agent $Rb^0$, which favored even at the same reaction temperature (350° C.) topochemical reduction to oA-$La_2O_2S$.

Figure 3:
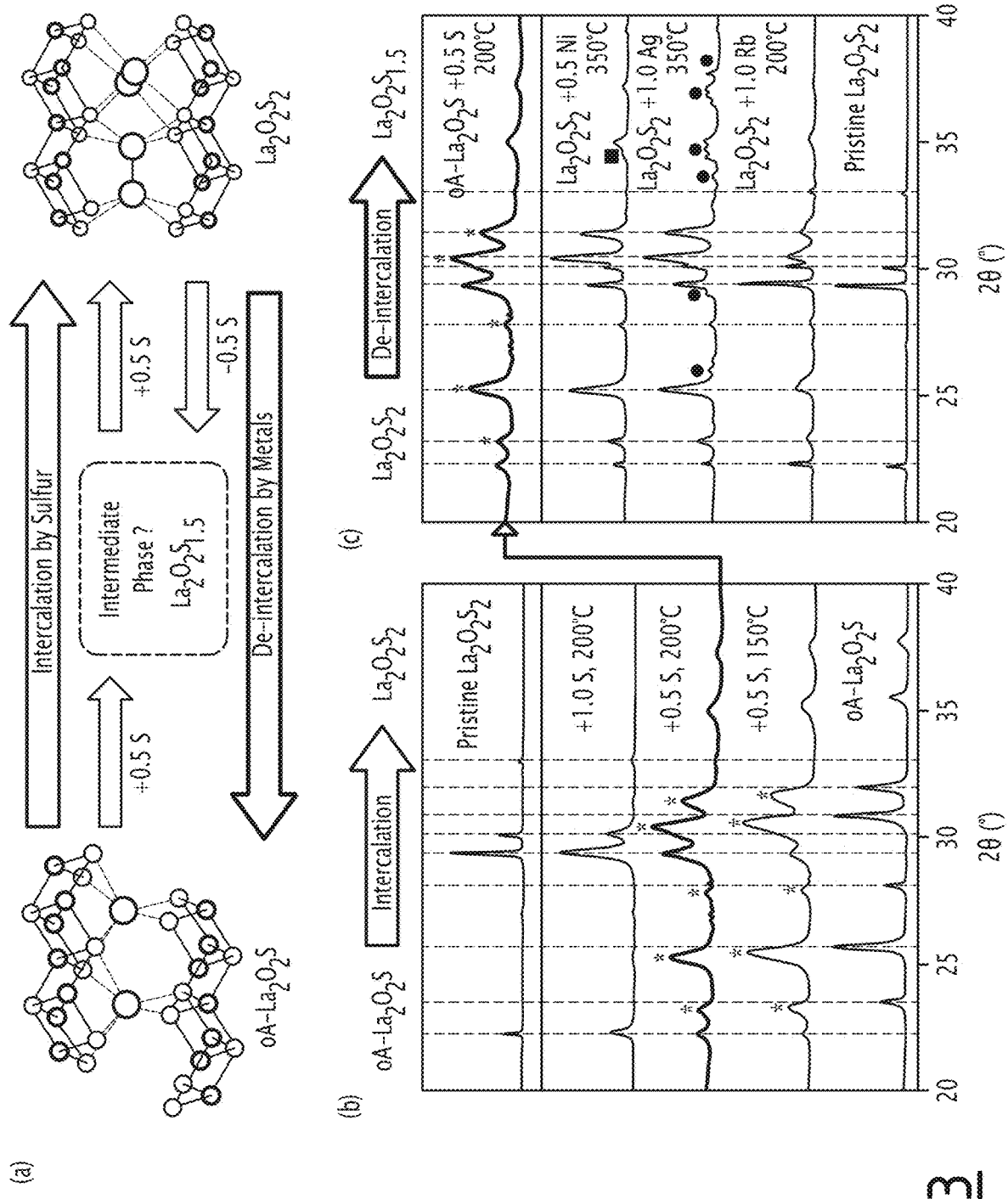
FIG. 3 illustrates (a) the partial intercalation of sulfur into $oA-La_2O_2S$ and de-intercalation of sulfur from $La_2O_2S_2$ that leads to an intermediate compound $oA-La_2O_2S_{1.5}$; (b) intercalation experiments of sulphur into $oA-La_2O_2S$. Experimental XRD patterns of pure $oA-La_2O_2S$ and the products of its mixture with sulfur (0.5 or 1 equiv. of S) after thermal treatments at 150 or 200° C. The new XRD peaks emerging after the thermal treatment with 0.5 S are marked by *; (c) Deinterclation of sulphur from $La_2O_2S_2$. Experimental XRD patterns of $La_2O_2S_2$ and of the product of its mixture with $Rb^0$, $Ag^0$ and $Ni^0$ after the thermal treatments at 200 or 350° C. The XRD peaks assigned to by-products are marked as follows: •=$Ag_2S$ (*Für Krist. —Cryst. Mater.* 110, 136-144 (1958); ■=α-NiS (J. Trahan, R. G. Goodrich, S. F. Watkins, *Phys. Rev. B* 2, 2859-2863 (1970)).

At this stage, it was hypothesized that the topotactic de-intercalation of $La_2O_2S_2$ may be reversible or not at low temperature. To test this possibility, a portion of oA-$La_2O_2S$ was mixed with one equivalent sulfur and heated at 200° C. (FIG. 3a). The product was analyzed by means of XRD as shown in FIG. 3b. The original $La_2O_2S_2$ material could be fully recovered with no sub-product confirming the reversible character of the temperature-assisted intercalation/de-intercalation processes based on the formation/rupture of sulfur dimers within the $La_2O_2S$/$La_2O_2S_2$ layered oxychalcogenides. To gain more insight about the intercalation of sulfur, the reactivity of oA-$La_2O_2S$ towards only half equivalent of sulfur at low temperature was also tested. The XRD pattern of the product obtained from intercalation of 0.5 S in oA-$La_2O_2S$ at 200° C. (see FIG. 3b) clearly evidences the conversion of oA-$La_2O_2S$ into an unknown intermediate phase along with a small amount of $La_2O_2S_2$. The XRD pattern of the intermediate phase was similar to that of oA-$La_2O_2S$ but shifted to lower diffraction angles, suggesting the existence of an intercalated oA-$La_2O_2S_x$ phase (1<x<2.0). The same XRD pattern was observed in the attempt to de-intercalate 0.5 S from $La_2O_2S_2$ using 1.0 equiv. of $Rb^0$, 1.0 equiv. of Ag and 0.5 equiv. of $Ni^0$ (FIG. 3c). Diffraction pattern of oA-$La_2O_2S_{1.5}$ could be refined with the same space group as oA-$La_2O_2S$ (Amm2) and cell parameters of ~8.4 Å, ~4.0 Å and ~12.8 Å without any superstructure peak. This clearly proved the existence of an intermediate phase with a strong reminiscence of the oA-$La_2O_2S$ structure. One of the reasonable assumptions is that this new intermediate phase replaced one half of monoatomic $S^{2-}$with dimeric $(S_2)^{2-}$ anions retaining the main structural framework of oA-$La_2O_2S$. This partial dimerization should lead to the expected oA-$La_2O_2S_{1.5}$ composition. Indeed, both intercalation of 0.5 S and de-intercalation of 0.5 S using metal species gave the similar Raman spectra that featured the single intense peak at 413-417 cm$^{-1}$ while Raman peaks from oA-$La_2O_2S$ nor $La_2O_2S_2$ were absent. Since an intense peak around 400-500 cm$^{-1}$ is characteristic of S—S stretching mode (*Angew. Chem. Int. Ed. Engl.* 14, 655-720 (1975)) these Raman spectra support the formation of oA-$La_2O_2S_{1.5}$ through the partial cleavage of S—S bonds.

To solve the crystal structure of this novel phase, precession electron diffraction tomography (PEDT) analyses were performed. This emerging technique can reduce dynamical diffraction effects during data collection and enables complex structures to be solved ab initio using single nanocrystals. PEDT data were therefore collected on several nanocrystals of the novel phase. All data sets were analyzed using the computer programs PETS2.0 (*Acta Crystallographica, B*75, 512-522 (2019).), Superflip (*Journal of Applied Crystallography*, 40, 451-456. (2007)) and Jana2006 (*Zeitschrift für Kristallographie*, 229, 345-352. (2014)). The reconstruction of the reciprocal lattice planes hk0, h0l and 0kl was observed which are consistent with an orthorhombic unit cell a=8.348 Å, b=3.961 Å and c=12.645 Å (V=418.1 Å$^3$) and a non-centrosymmetric space group Amm2. The structure was subsequently solved and refined using the Jana2006 Program on the basis of electron diffraction data. The structural analysis converged with electron Bragg reliability factor R(obs)=10.1%, revealing a layered structure with a composition oA-$La_2O_2S_{1.5}$. This obtained new structure consists of 2/∞[$La_2O_2$]fluorine-type (001) infinite slab alternating with sulfur layers containing one third and two thirds of sulfur anions as $S^{2-}$ and $(S_2)^{2-}$ species, respectively. Using this oA-$La_2O_2S_{1.5}$ structure model, both powder XRD patterns from sulfur intercalation and de-intercalation, i.e. from oA-$La_2O_2S$+0.5 S and $La_2O_2S_2$+0.5 Ni reaction mixtures (see FIG. 3), were successfully refined. Large strain parameters had to be considered to reach satisfactory fitting. This can be interpreted as the signature of a stacking disorder occurring, as expected, during the intercalation or de-intercalation processes in relation with the 2D structure of the host lattice and possible existence of different stages. The structural analysis was based on data collected on the best crystallized crystals. However, in most of the PEDT data, the stacking faults lead to diffuse scattering features along [001]. The experimental contrast in the HAADF-STEM image asserts the stacking of 2/∞[$La_2O_2$]fluorine-type (001) infinite slabs. A similar structure was predicted independently by the evolutionary algorithm USPEX for this specific oA-$La_2O_2S_{1.5}$ composition. The structure predicted to be the most stable accorded well with the experimental structure obtained by the PEDT analysis. The $2^{nd}$ and $3^{rd}$ most stable structures displayed 1D slabs and 2D hexagonal (fluorine-type (111)) slabs as their [$La_2O_2$] units and these slabs constituted intergrowth structures with (quasi-) 2D arrays of sulfur dimers/atoms. However, none of them could be found in the experiments that were conducted.

Figure 4:
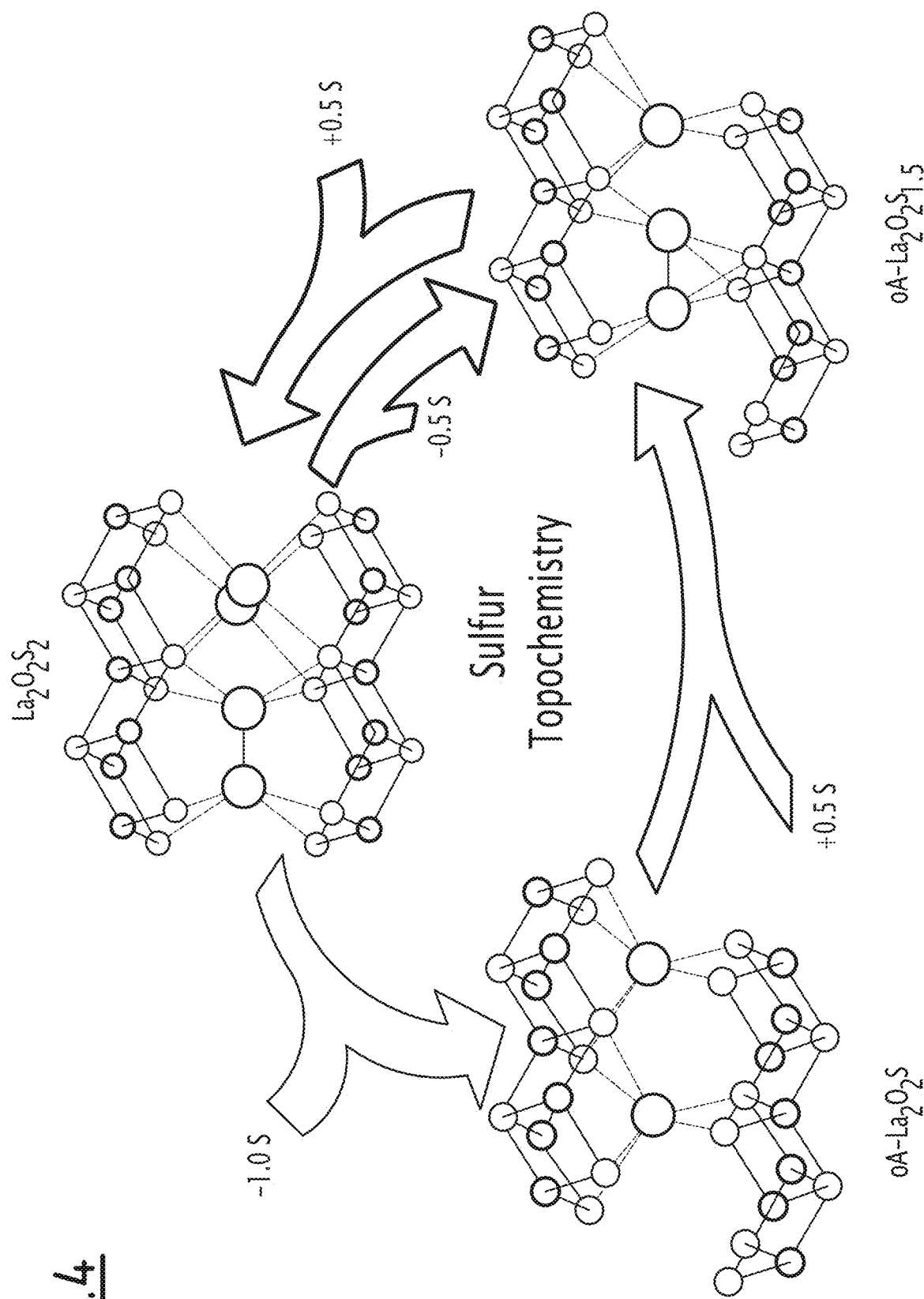
FIG. 4 represents the overview of the rich low temperature sulfur topochemistry in the La—O—S system. The topochemical intercalation and deintercalation of sulfur in the oxychalcogenide compound $La_2O_2S_2$ lead to the formation of two new metastable compounds.

This work demonstrates the de-intercalation and re-intercalation of sulfur in a layered oxychalcogenide compound using an original topochemical approach. Alkali or transition metals may be used as reducing agent to trigger the reduction of the chalcogenide oligomers and breaking the chalcogen-chalcogen bond. In the case of $La_2O_2S_2$ the low temperature deintercalation of sulfur atoms proceeds in a two steps to form two new metastable phases oA-$La_2O_2S_{1.5}$ and oA-$La_2O_2S$ that retain the layered feature of the precursor. As illustrated in FIG. 4 this is a fully reversible topotactic process as the sulfur atoms may be re-intercalated at low temperature to form back the precursor $La_2O_2S_2$.
[Table2]

TABLE 2

Summary of crystallographic parameters of $La_2O_2S_x$ series (1 ≤ x ≤ 2.0)

|  | $La_2O_2S_2$ | hP-$La_2O_2S_2$ | oA-$La_2O_2S$ | oA-$La_2O_2S_{1.5}$ |
|---|---|---|---|---|
| Source | Ostorer et al. (XRD) | Morosin et al. (XRD) | This study (XRD) | This study (PEDT) |
| Space group | Cmca | P-3m1 | Amm2 | Amm2 |
| a (Å) | 13.215(2) | 4.049(1) | 4.148(9) | 8.348 |
| b (Å) | 5.943(1) | — | 3.975(1) | 3.961 |

TABLE 2-continued

Summary of crystallographic parameters of $La_2O_2S_x$ series (1 ≤ x ≤ 2.0)

|  | $La_2O_2S_2$ | hP-$La_2O_2S_2$ | oA-$La_2O_2S$ | oA-$La_2O_2S_{1.5}$ |
|---|---|---|---|---|
| c (Å) | 5.938(1) | 6.939(2) | 12.728(0) | 12.645 |
| S-S distance (Å) | 2.103 | 4.049 | 3.975 | 2.011 |

Ostero et al *Acta Cryst.* C46, 1376-1378 (1990)
Morosin et al *Angew. Chem. Int. Ed. Engl.* 14, 655-720 (1975)

1. Synthetic Procedures

The initial precursor $La_2O_2S_2$ was synthesized following the procedure described in *Angew. Chem. Int. Ed.* 2018, 57, 13618-13623 oA-$La_2O_2S$: Topochemical De-Intercalation of $S^{2-}$ Anions by Rb

Prior to the preparation, all of experimental glassware and utensils were dried in the oven (T=80° C.). Under argon atmosphere, $La_2O_2S_2$ and Rb (Aldrich, 98+%) were weighed in 1:2 molar ratio and introduced into the silica tube whose bottom was protected by carbon coating. All these preparations were done under argon atmosphere. Then the pyrex tube was evacuated (~$10^{-3}$ torr) and sealed. The sealed mixture was heated to 200° C. at a rate of 20° C. h$^{-1}$ and annealed for 2 h. Finally the sealed mixture was gradually cooled in a furnace to give the pale greyish-blue powder. The surplus Rb deposited on the opposite side of the silica tube. The silica tube was opened under argon atmosphere and all the content was quenched with the excess amount of ethanol (Attention: under the ambient atmosphere, Rb ignites upon the contact with ethanol). The colorless precipitate was contaminated by the tiny flakes of carbon, which were separated by repetitive decantation with mechanical agitation. The precipitate was then washed with ethanol, water, and acetone, followed by dryness in vacuo to afford the colorless powder of oA-$La_2O_2S$. The product was stable under the ambient atmosphere. The same reaction performed at 350° C. also gave the identical results: pure oA-$La_2O_2S$ without any trace of hP-$La_2O_2S_2$ nor any other impurities.

Intercalation of Sulfur Anions into oA-$La_2O_2S$

The colorless powder of oA-$La_2O_2S$ (ca. 200 mg) was combined with S flakes (Aldrich, 99.99+%) in oA-$La_2O_2S$:S=1:0.5 molar ratio and ground on an agate mortar under argon atmosphere. Then the mixture was pelletized and sealed in an evacuated (~10-3 torr) silica tube. The sealed mixture was heated to 150-200° C. at a rate of 100° C. h$^{-1}$ and annealed for 4-48 h (See FIG. 3b for the result), followed by gradual cooling in a furnace to afford the pale yellow pellet. When the sulfur was not completely consumed, the residual sulfur was deposited on the opposite side of the silica tube. To complete the intercalation, the obtained pellet was ground with additional 0.5 equiv. of S under argon atmosphere. The mixture was again subject to the thermal treatment at 200° C. in the evacuated silica tube. After 160 h of annealing, the mixture was fully converted into the pale yellow pellet of the pure $La_2O_2S_2$.

oA-$La_4O_4S_3$: General Procedure for topochemical de-Intercalation of $S^{2-}$ Anions by Various Metals The detailed synthetic conditions (i.e. Stoichiometry, duration of annealing, forms of metal sources) for respective metal species were noted below. To 1.0 equiv. of $La_2O_2S_2$ (ca. 150-250 mg), 0.5-2.0 equiv. of metal elements was added and ground together under argon atmosphere until the powder becomes greyish and sticky on an agate mortar. Then the mixture was pelletized and sealed in an evacuated (~10-3 torr) silica tube. The sealed mixture was heated to 350° C. at a rate of 300° C. h$^{-1}$ and annealed for 2-4 h. Finally the sealed mixture was gradually cooled in a furnace to afford the mixture containing oA-La$_4$O$_4$S$_3$ (See FIG. 3c for its XRD).

The Reaction with Ag:

1.0 equiv. of Ag powder (Aldrich, 2-3.5 μm, ≥99.9%) was added. Annealing: 4 h Little excess (~1.1 equiv.) of Ag nor prolonged/repeated thermal treatments did not lead further consumption of La$_2$O$_2$S$_2$.

The Reaction with Ni:

0.5 equiv. of Ni nanopowder (Aldrich, <100 nm, 99%) was added. Annealing: 4 h Prolonged and repeated thermal treatments did not improve the yield of oA-La$_4$O$_4$S$_3$ but ended up with the partial decomposition into hP-La$_2$O$_2$S

The invention claimed is:

1. An electrochemical cell comprising:
   a positive electrode comprising an electroactive material comprising a chalcogen oligomer, wherein said chalcogen oligomer represents a linear or non-linear sequence of 2 to 6 sulfur atoms, and wherein said electroactive material reversibly deintercalates an anion of sulfur by reduction and reintercalates said sulfur anion by oxidation, while maintaining the crystal structure of said electroactive material;
   a negative electrode; and
   an electrolyte layer sandwiched between said positive and said negative electrodes.

2. A battery comprising a plurality of electrochemical cells as defined in claim 1, wherein said electrochemical cells are electrically connected.

3. The electrochemical cell according to claim 1 wherein said electroactive material is chosen from La$_2$O$_2$S$_2$, SrS$_2$, SrS$_3$, BaS$_2$, BaS$_3$, Ba$_2$S$_2$F$_2$, FeS$_2$, NiS$_2$, CoS$_2$, MnS$_2$, TiS$_3$, VS$_4$, PbS$_2$ and BiS$_2$.

4. The electrochemical cell according to claim 1 wherein said electroactive material is La$_2$O$_2$S$_2$, which reversibly deintercalates and reintercalates S$^{2-}$ according to the following reaction:

$$La_2O_2S_2 + 2e^- \leftrightarrows oA\text{-}La_2O_2S + S^{2-}$$

where oA designates a centered orthorombic crystalline form.

5. The electrochemical cell according to claim 1 wherein said electroactive material is a material of formula (I):

$$oA\text{-}La_2O_2S \qquad (I)$$

where oA designates a centered orthorombic crystalline form.

6. The electrochemical cell according to claim 1 wherein said electroactive material is a material of formula (II):

$$oA\text{-}La_2O_2S_{1.5} \qquad (II)$$

where oA designates a centered orthorhombic crystalline form.

7. The electrochemical cell according to claim 1 wherein said positive electrode comprises:
   a current collector; and
   a coating layer comprising said electroactive material.

8. The electrochemical cell according to claim 7, wherein the current collector is an aluminum sheet.

9. An electroactive material for an electrochemical cell electrode, said electroactive material comprising a chalcogen oligomer, wherein said electroactive material reversibly deintercalates an anion of said chalcogen by reduction and reintercalates said anion by oxidation, while maintaining the crystal structure of said electroactive material, wherein said electroactive material is either a material of formula (I):

$$oA\text{-}La_2O_2S \qquad (I)$$

or a material of formula (II):

$$oA\text{-}La_2O_2S_{1.5} \qquad (II)$$

where oA designates a centered orthorombic crystalline form.

10. A positive electrode comprising the electroactive material according to claim 9.

11. The positive electrode according to claim 10 comprising:
   a current collector; and
   a coating layer comprising said electroactive material.

12. The positive electrode according to claim 11, wherein the current collector is an aluminum sheet.

* * * * *